ism(12) United States Patent
Deng et al.

(10) Patent No.: US 7,787,229 B2
(45) Date of Patent: Aug. 31, 2010

(54) CPU POWER CONTROL CIRCUIT

(75) Inventors: Hu-Fei Deng, Shenzhen (CN); Ning Wang, Shenzhen (CN); Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 288 days.

(21) Appl. No.: 12/043,960

(22) Filed: Mar. 7, 2008

(65) Prior Publication Data

US 2009/0168285 A1 Jul. 2, 2009

(30) Foreign Application Priority Data

Dec. 28, 2007 (CN) .................... 2007 1 0203515

(51) Int. Cl.
*H02H 5/04* (2006.01)
*G01K 5/04* (2006.01)
(52) U.S. Cl. ...................................... 361/103; 374/163
(58) Field of Classification Search .................. 361/103
See application file for complete search history.

(56) References Cited

U.S. PATENT DOCUMENTS

| 7,353,133 | B2 * | 4/2008 | Park ........................... 702/130 |
| 2006/0119324 | A1 * | 6/2006 | Kim ........................... 320/150 |
| 2008/0123238 | A1 * | 5/2008 | Campos et al. ............. 361/103 |

FOREIGN PATENT DOCUMENTS

CN          1941532 A          4/2007

* cited by examiner

*Primary Examiner*—Jared J Fureman
*Assistant Examiner*—Dharti H Patel
(74) *Attorney, Agent, or Firm*—Frank R. Niranjan

(57) ABSTRACT

A CPU power control circuit includes a temperature detection circuit, a power supply circuit and a discharge circuit. The power supply circuit is connected to the temperature detection circuit, a CPU and the discharge circuit. The discharge circuit is connected to the temperature detection circuit and the CPU. The temperature detection circuit is connected to the CPU for detecting the temperature of the CPU. When the temperature of the CPU exceeds a predetermined range, the temperature detection circuit outputs a high temperature signal. The power supply circuit receives the high temperature signal, and stops working. The discharge circuit receives the high temperature signal, and discharges the power supply circuit so as to stop supplying power to the CPU.

8 Claims, 4 Drawing Sheets

CPU POWER CONTROL CIRCUIT

BACKGROUND

1. Field of the Invention

The present invention relates to power control circuits, and particularly to a CPU power control circuit.

2. Description of Related Art

Generally, a computer system includes a motherboard with various chips such as a central processing unit (CPU) mounted thereon, a storage device such as a hard disc, and input/output devices, each of which is known to generate heat when operated in a computer system, especially the CPU.

Typically, a sensor is programmed to be used as a temperature detector for detecting temperature of the CPU. A computer fan is used to facilitate removal of heat to keep the temperature of the CPU within a safe range. If there is something wrong with the computer fan, the heat generated from the CPU may not be dissipated and damage the CPU.

What is needed, therefore, is a CPU power control circuit which can solve the above problem.

SUMMARY

An exemplary CPU power control circuit includes a temperature detection circuit, a power supply circuit, and a discharge circuit. The power supply circuit is connected to the temperature detection circuit, a CPU, and the discharge circuit. The discharge circuit is connected to the temperature detection circuit and the CPU. The temperature detection circuit is connected to the CPU for detecting the temperature of the CPU. When the temperature of the CPU exceeds a predetermined range, the temperature detection circuit outputs a high temperature signal. The power supply circuit receives the high temperature signal, and stops working. The discharge circuit receives the high temperature signal, and discharges the power supply circuit so as to stop supplying power to the CPU.

Other advantages and novel features of the present invention will become more apparent from the following detailed description of preferred embodiment when taken in conjunction with the accompanying drawing, in which:

DETAILED DESCRIPTION

Figure 1:
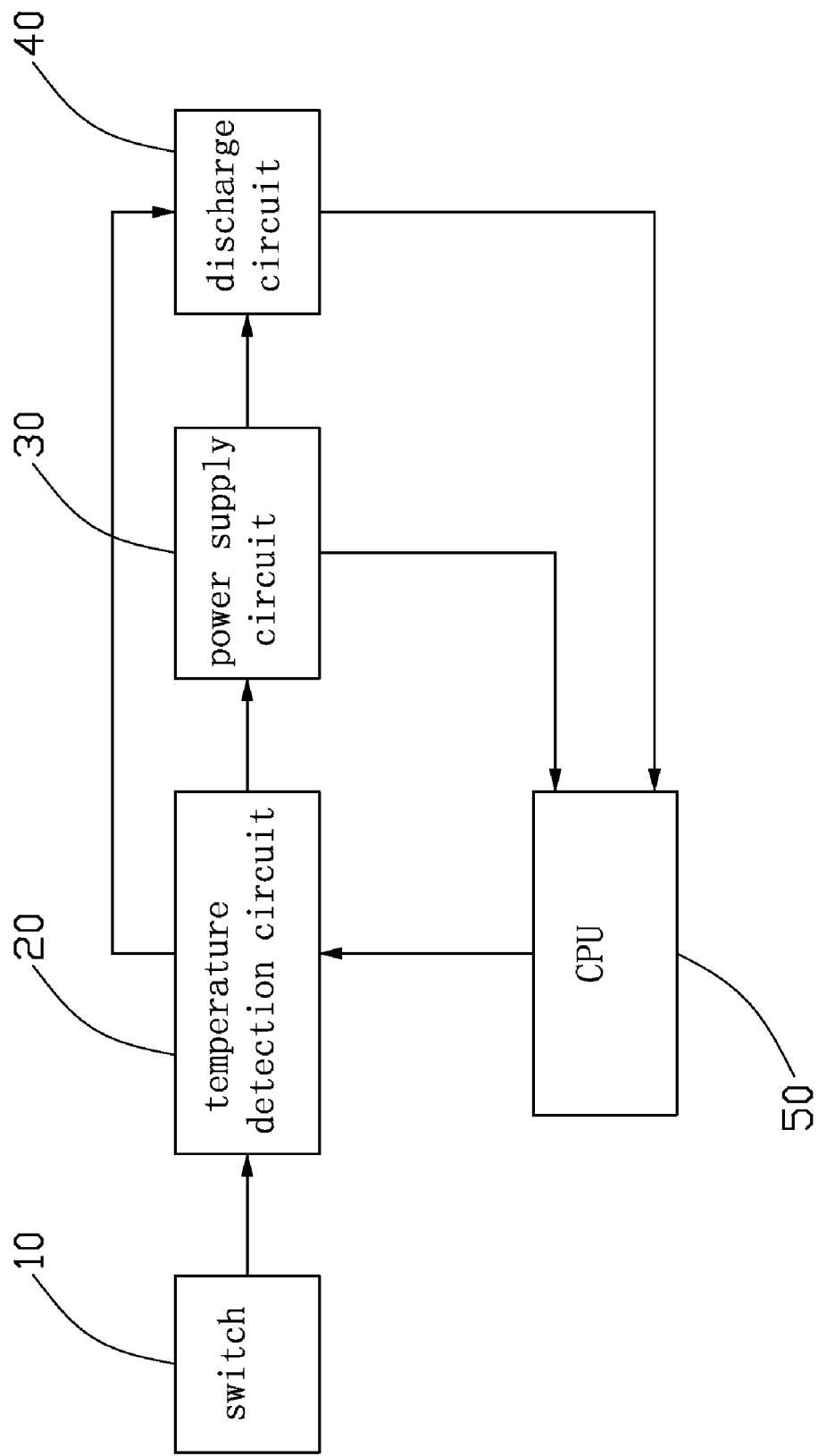
FIG. 1 is a block diagram of a CPU power control circuit in accordance with an embodiment of the present invention, the CPU power control circuit including a CPU, a switch, a temperature detecting circuit, a power supply circuit, and a discharge circuit.

Referring to FIG. 1, a CPU power control circuit in accordance with an embodiment of the present invention includes a switch 10, a temperature detection circuit 20, a power supply circuit 30, and a discharge circuit 40. The switch 10 is connected to the temperature detection circuit 20. The power supply circuit 30 is connected to the temperature detection circuit 20, a CPU 50, and the discharge circuit 40. The discharge circuit 40 is connected to the temperature detection circuit 20 and the CPU 50. The temperature detection circuit 20 is connected to the CPU 50.

Figure 2:
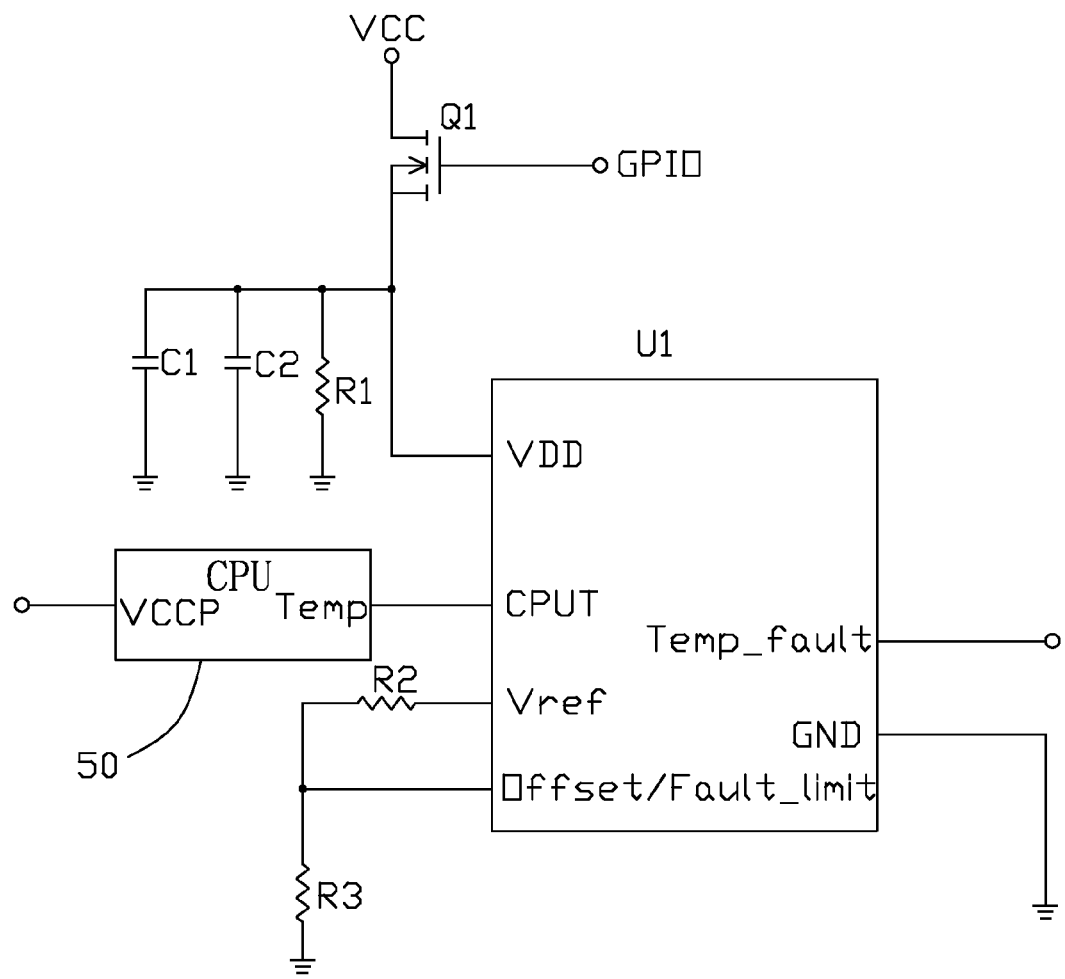
FIG. 2 is a circuit diagram of the CPU, the switch, and the temperature detection circuit of FIG. 1.

Referring to FIG. 2, the switch 10 includes a NMOS transistor Q1. The temperature detection circuit 20 includes a temperature detection chip U1, two capacitors C1, C2, and three resistors R1, R2 and R3. The gate of the NMOS transistor Q1 is connected to an input/output end GPIO of a BIOS, the drain of the NMOS transistor Q1 is connected to a power supply VCC, the source of the NMOS transistor Q1 is connected to a voltage control end VDD of the temperature detection chip U1. The capacitors C1, C2 and the resistor R1 are connected in parallel between the source of the NMOS transistor Q1 and ground. A temperature detection end CPUT of the temperature detection chip U1 is connected to a temperature output end Temp of the CPU 50. A reference end Vref of the temperature detection chip U1 is grounded via the resistors R2 and R3. A compare end Offset/Fault_limit is connected to a node between the resistors R2 and R3, a ground end GND is grounded.

Figure 3:
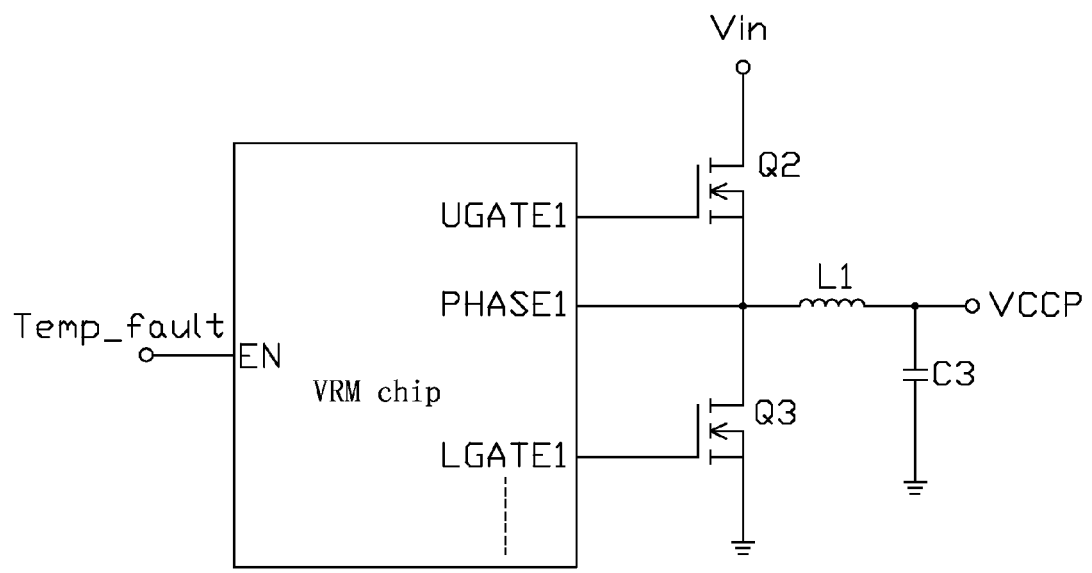
FIG. 3 is a circuit diagram of the power supply circuit of FIG. 1.

Referring to FIG. 3, the power supply circuit 30 includes a voltage regulator module (VRM) chip, two NMOS transistors Q2 and Q3, an inductor L1, and a capacitor C3. An input pin EN of the VRM chip is connected to a temperature determining output end Temp_fault of the temperature detection chip U1. A first output pin UGATE1 of the VRM chip is connected to the gate of the NMOS transistor Q2, the drain of the NMOS transistor Q2 is connected to a power supply Vin, the source of the NMOS transistor Q2, and the drain of the NMOS transistor Q3 are connected to a first phase pin PHASE1 of the VRM chip. The gate of the NMOS transistor Q3 is connected to a second output pin LGATE1 of the VRM chip, the source of the NMOS transistor Q3 is grounded. One end of the inductor L1 is connected to the first phase pin PHASE1 of the VRM chip. The other end of the inductor L1 is grounded via the capacitor C3, and is also connected to a power supply end VCCP of the CPU 50.

Figure 4:
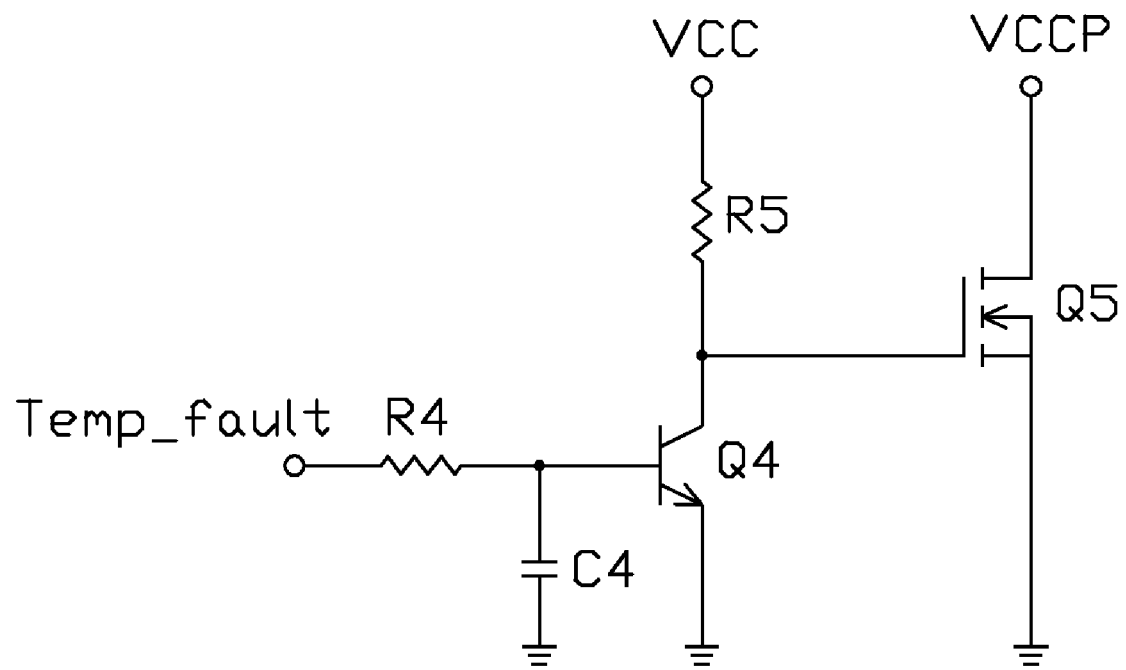
FIG. 4 is a circuit diagram of the discharge circuit of FIG. 1.

Referring to FIG. 4, the discharge circuit 40 includes a capacitor C4, two resistors R4 and R5, a transistor Q4, and an NMOS transistor Q5. The transistor Q4 is an NPN transistor. One end of the resistor R4 is connected to the temperature determining output end Temp_fault of the temperature detection chip U1, the other end of the resistor R4 is grounded via the capacitor C4. The base of the transistor Q4 is connected to a node between the resistor R4 and the capacitor C4, the collector of the transistor Q4 is connected to the power supply VCC via the resistor R5, the emitter of the transistor Q4 is grounded. The source of the NMOS transistor Q5 is grounded, the gate of the NMOS transistor Q5 is connected to the collector of the transistor Q4, the drain of the NMOS transistor Q5 is connected to the power supply end VCCP of the CPU 50.

Users can go into BIOS to set the input/output end GPIO to low level to disable the protection function of the CPU power control circuit. Thus, the NMOS transistor Q1 is off, so that the power supply VCC does not supply power to the temperature detection chip U1 and the temperature detection chip U1 does not work.

The user can also set the input/output GPIO of the BIOS to high level to activate the protection function of the CPU power control circuit. Thus, the NMOS transistor Q1 turns on. The power supply VCC supplies power to the temperature detection chip U1. The CPU 50 outputs a temperature value to the temperature detection end CPUT. After the temperature detection chip U1 receives the temperature value and compares the temperature value with a predetermined safe temperature value of the CPU 50, then judges whether the temperature value exceeds the safe value. If the temperature value exceeds the safe value, the temperature output end Temp_fault outputs a low level signal.

The input pin EN of the VRM chip receives the low level signal output from the temperature output end Temp_fault, and the VRM chip stops working. The discharge circuit 40 receives the low level signal output from the temperature output end Temp_fault, and the transistor Q4 turns off, the NMOS transistor Q5 turns on, the power supply end VCCP of the CPU 50 is at low level, the capacitor C3 and the induction L1 discharges through the discharge circuit 40, and the power supply end VCCP stops supplying power to the power supply end VCCP of the CPU 50. Then the CPU 50 stops working.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A CPU (central processing unit) power control circuit comprising:
   a temperature detection circuit connected to a CPU to detect temperature of the CPU and output a control signal;
   a power supply circuit connected to the temperature detection circuit, and the CPU to supply power to the CPU; the power supply circuit comprising:
      a voltage regulator module (VRM) chip comprising an input pin connected to the temperature detection circuit to receive the control signal, a first output pin, a second output pin, and a phase pin;
      a first transistor comprising a gate connected to the first output pin of the VRM chip, a drain connected to a first power supply, and a source connected to the phase pin of the VRM chip;
      a second transistor comprising a gate connected to the second output pin of the VRM chip, a drain connected to the phase pin of the VRM chip, and a source grounded;
      an inductor comprising a first terminal connected to the phase pin of the VRM chip and a second terminal connected to the CPU to supply power to the CPU; and
      a first capacitor connected between the second terminal of the inductor and the ground;
   a discharge circuit comprising:
      a first switch connected to the input pin of the VRM chip to receive the control signal from the temperature detection circuit, to control turn on or off of the first switch; and
      a second switch arranged to connect the second terminal of the inductor and ground under the control of the turn on or off of the first switch;
   when the temperature of the CPU exceeds a safe temperature, the temperature detection circuit outputs the control signal to the input pin of the VRM chip to stop the VRM chip from working thereby to stop supplying power to the CPU, and power from the inductor and the first capacitor is discharged via the second switch.

2. The power control circuit as claimed in claim 1, further comprising a third switch, wherein the third switch is connected between a second power supply and the temperature detection circuit, and has a control terminal connected to a BIOS (basic input output system) of a computer, and the third switch is adapted for controlling whether the the second power supply provides power to the temperature detection circuit.

3. The power control circuit as claimed in claim 2, wherein the third switch is a first NMOS transistor, the gate of the first NMOS transistor is connected to an input and output end of the BIOS, the source of the first NMOS transistor is connected to a voltage control end of the temperature detection circuit, the drain of the first NMOS transistor is connected to the second power supply, a temperature detection end of the temperature detection circuit is connected to a temperature output end of the CPU, and a temperature determining output end of the temperature detection circuit is connected to the the input pin of the VRM chip and the first switch to output the control signal, a power supply end of the CPU is connected to the second terminal of the inductor and the second switch.

4. The power control circuit as claimed in claim 3, wherein the first switch is an NPN transistor, the base of the NPN transistor is connected to the temperature determining output end of the temperature detection circuit, the collector of the NPN transistor is connected to the second power supply, and the emitter of the NPN transistor is grounded.

5. The power control circuit as claimed in claim 4, wherein the discharge circuit comprises a first resistor, a second resistor and a second capacitor, two ends of the first resistor are respectively connected to the temperature determining output end of the temperature detection circuit and the base of the NPN transistor, two ends of the second resistor are respectively connected to the collector of the NPN transistor and the second power supply, and two ends of the second capacitor are respectively connected to the base of the NPN transistor and ground.

6. The power control circuit as claimed in claim 5, wherein the second switch comprises a second NMOS transistor, the source of the second NMOS transistor is grounded, the gate of the second NMOS transistor is connected to the collector of the NPN transistor, and the drain of the second NMOS transistor is connected to the second terminal of the inductor.

7. The power control circuit as claimed in claim 6, wherein the temperature detection circuit comprises a temperature detection chip, a third resistor, a fourth resistor, a fifth resistor and a third capacitor, the third capacitor and the third resistor are connected in parallel between the voltage control end of the temperature detection chip and ground, the temperature detection end of the temperature detection chip is connected to the temperature output end of the CPU, a reference end of the temperature detection chip is grounded via the fourth and the fifth resistors, a comparison end of the temperature detection chip is connected to a node between the fourth resistor and the fifth resistor, and the temperature determining output end of the temperature detection chip is connected to the the input pin of the VRM chip and the base of the NPN transistor.

8. A CPU (central processing unit) power control circuit comprising:
   a temperature detection circuit connected to a CPU for detecting temperature of the CPU, the temperature detection circuit comprising a voltage control end, a temperature detection end connected to a temperature output end of the CPU, and a temperature determining output end;

an NMOS transistor comprising a gate connected to an input and output end of a BIOS, a source connected to the voltage control terminal of the temperature detection circuit, and a drain connected to a power supply, therefore the BIOS controls the power supply to supply working voltage to the temperature detection circuit;

a power supply circuit connected to the temperature determining output end of the temperature detection circuit and the CPU, for supplying power to the CPU;

a discharge circuit connected to the temperature determining output end of the temperature detection circuit and the CPU for discharging the power supply circuit;

wherein the temperature of the CPU exceeds a safe temperature, the temperature output end of the temperature detection circuit outputs a low temperature signal; the power supply circuit receives the low temperature signal, and stops working; the discharge circuit receives the low temperature signal, and discharges the power supply circuit so as to stop supplying power to the CPU.

* * * * *